US006959957B2

(12) United States Patent
Fukuchi et al.

(10) Patent No.: US 6,959,957 B2
(45) Date of Patent: Nov. 1, 2005

(54) VEHICLE DOOR AND APPARATUS FOR PREVENTING DOOR FROM INTRUDING INTO VEHICLE ROOM IN SIDE-ON COLLISION VEHICLE

(75) Inventors: Fumiaki Fukuchi, Saitama (JP); Yujiro Tashima, Saitama (JP); Makoto Uchikawa, Saitama (JP); Katsuhiro Shibata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/755,670

(22) Filed: Jan. 13, 2004

(65) Prior Publication Data

US 2004/0189051 A1 Sep. 30, 2004

(30) Foreign Application Priority Data

Jan. 14, 2003 (JP) ............................ 2003-006107
Jan. 14, 2003 (JP) ............................ 2003-006108
Jan. 21, 2003 (JP) ............................ 2003-012408
Apr. 15, 2003 (JP) ............................ 2003-109746

(51) Int. Cl.[7] .................................................. B60J 5/00

(52) U.S. Cl. .................................... 296/146.5; 296/152

(58) Field of Search .......................... 296/146.5–146.6, 296/152; 49/502

(56) References Cited

U.S. PATENT DOCUMENTS 4,866,883 A * 9/1989 Brown et al. ................. 49/502
5,007,201 A * 4/1991 D'Hoore et al. .............. 49/348
6,176,542 B1 * 1/2001 Gooding et al. ......... 296/146.6
6,428,081 B1 * 8/2002 Williams et al. ......... 296/146.7
6,550,846 B1 * 4/2003 Chappuis et al. ........ 296/146.5
2002/0046502 A1 * 4/2002 Dobson ....................... 49/502

FOREIGN PATENT DOCUMENTS

JP 58-19923 4/1983
JP 07-081407 3/1995
JP 2000-240346 * 9/2000
JP 2001-246935 9/2001

OTHER PUBLICATIONS

NASA Website, "Center of Gravity", pp. 1-3,www.grc.nasa.gov/WWW/K-12.airplane/cg.html.*

* cited by examiner

*Primary Examiner*—Dennis H. Pedder
(74) *Attorney, Agent, or Firm*—Arent Fox PLLC

(57) ABSTRACT

The plurality of built-in parts 6, 7, 8, 9 are disposed in such a manner that the center of gravity G2 of these built-in parts is situated on the opposite side of the door hinge 5 with respect to the position of the total center of gravity G1 of the door main body itself and the completely-closed window-pane 10. Especially, the drive motor 63 of the window regulator 6 is disposed spaced from the center of gravity G1 on the opposite side of the door hinge 5.

3 Claims, 14 Drawing Sheets

VEHICLE DOOR AND APPARATUS FOR PREVENTING DOOR FROM INTRUDING INTO VEHICLE ROOM IN SIDE-ON COLLISION VEHICLE

BACKGROUND OF THE INVENTION

The present invention relates to a vehicle door in which at least one of a door outer panel and a door inner panel constituting a door main body is made of a light alloy.

Further, the present invention relates to a vehicle door structure and, in particular, to a vehicle door structure including an inner panel including a casting and a guard beam which, when a door is closed, extends in the back-and-forth direction of a vehicle and has two end portions thereof respectively fixed to the inner panel.

Further, the present invention relates to an apparatus for preventing a door from intruding into a vehicle room in a vehicle which is collided side-on.

Further, the present invention relates to an inner panel for a vehicle door.

Conventionally, in order to improve the mileage of the vehicle through reduction of the weight thereof, there is known a vehicle door in which a door outer panel includes an expanded material formed of a light alloy such as an aluminum alloy or a magnesium alloy and a door inner panel is made of a casting formed of a light alloy, thereby reducing the weight of the vehicle door (For example, the patent reference 1).

[Patent Reference 1]

JP-A-7-81407

In case where the door outer panel and door inner panel are made of a light alloy in the above-mentioned manner, the mileage of the vehicle can be improved through the reduction of the weight thereof; however, the moment of inertia with a door hinge as a fulcrum is lowered so that, when the door is opened and closed, especially when the door is closed, the operation efficiency (the closing performance) is degraded. That is, to obtain the kinetic energy that is necessary to close the door completely, it is necessary to increase the closing speed of the door.

By the way, in the vehicle door, there are disposed a plurality of built-in parts which are stored within the door main body in such a manner that they are mounted on the door inner panel, such as a window regulator, a door lock, a guard beam and a speaker.

Further, conventionally, as a door structure of this type, there is known a door structure a guard beam is fastened through a bolt joint to a bracket portion cast integrally with an inner panel. In this door structure, the bracket continuously connected portion of the inner panel is formed large in thickness (for example, see the patent reference 2).

[Patent Reference 2]

JP-A-2001-246935

However, in the case of the above structure, there is a fear that, when an impact load is applied to the guard beam due to a side-on collision, stresses can concentrate onto the bracket continuously connected portion of the inner panel and thus a crack can be developed in the inner panel starting in and from the neighboring portion of the bracket continuously connected portion; and, in case where such crack occurs, the impact load cannot be absorbed sufficiently.

Further, conventionally, as an apparatus of this type, there is known an apparatus which, when a vehicle is collided side on, in order to prevent a door from intruding into a vehicle room by bringing a projecting portion formed in the door into engagement with an engaging portion formed in a vehicle body, a reinforcing plate is fixed to the steel-plate-made inner panel of the door and the base end of a pin-shaped member serving as the protecting portion is welded to the reinforcing plate (for example, see the patent reference 3).

[Patent Reference 3]

JP-UM-B-58-19923

However, in the above-cited conventional apparatus, because there are necessary a large number of man-hours and special parts for forming the projecting portion, the cost of the apparatus is high.

Further, conventionally, as an inner panel of this type, there is known an inner panel which is made of a casting (For example, see the patent reference 1).

The belt-shaped area of inner panel extends in the back-and-forth direction of the vehicle so as to cooperate together with an outer panel in forming an entrance for a windowpane and its neighboring portion is required to have high rigidity. However, in the case of the conventional inner panel, there is not found such a device as to be able to meet the above requirement for the rigidity of the belt-shaped area.

SUMMARY OF THE INVENTION

It is an object of the invention to provide a vehicle door which, using the above built-in parts, can prevent the degradation of the closing performance caused by the reduction of the weight of the vehicle door.

In attaining the above object, according to an aspect of the invention, there is provided a vehicle door structured such that at least one of a door outer panel and a door inner panel constituting a door main body is made of a light alloy, a door hinge for opening and closing the vehicle door is disposed on one end of the door inner panel, and there are disposed a windowpane and a plurality of built-in parts stored within the door main body while they are mounted on the door inner panel, the built-in parts including a window regulator for opening and closing the windowpane, wherein the plurality of built-in parts are disposed such that the total center of gravity of these built-in parts is situated on the opposite side of the door hinge with respect to the total center of gravity of the door main body itself and completely-closed windowpane.

According to the above structure, the distance from the total center of gravity of the built-in parts to the door hinge is longer than the distance from the total center of gravity of the door main body and the completely-closed windowpane to the door hinge. Thanks to this, the moment of inertia with the door hinge as a fulcrum thereof can be increased effectively by the built-in parts. Therefore, a great deal of kinetic energy can be obtained with a rather small closing speed, thereby being able to enhance the closing performance of the vehicle door.

Further, in case where the center of gravity of the whole door is deviated in one of the upward and downward directions, when the door seal is contacted with the door opening edge portion of a vehicle body just before the vehicle door is closed, the door seal is compressed strongly and unevenly on the portion thereof situated on the door center-of-gravity side, which can sometimes raise a possibility that, in a incompletely-closed door state before the portion of the door seal distant from the door center of gravity in the other of the upward and downward directions, the movement of the door in the closing direction can be caused to stop due to the compressive reaction force of the door seal, thereby degrading the closing performance of the door. Here, in case where the built-in parts are disposed so that the center of gravity of the whole of the door, that is, the total center of gravity of the door main body itself, the completely closed windowpane and the plurality of built-in parts is situated in a given upward-and-downward-direction range with the upward-and-downward-direction center of the door main body as a center thereof, the door seal can be compressed evenly, thereby being able to enhance the door closing performance further. By the way, the above-mentioned upward-and-downward direction, preferably, may be a range in which the spaced distances in the upward and downward directions from the upward-and-downward-direction center of the door main body are respectively equal to or less than ¼ of the height dimension of the door main body.

By the way, as the built-in parts, in addition to the window regulator, there are used a door lock, guard beams and a speaker as the typical parts; and, the setting positions of these parts are almost decided according to the functions thereof. That is, the door lock is disposed on the end portion of the door inner panel on the opposite side to the door hinge, the guard beams are disposed so as to extend substantially over the entire length of the door, and the speaker is disposed on the door hinge side; and, therefore, the degree of freedom of the setting positions of these parts is small. Due to this, in some cases, it is difficult to set the total center of gravity of the built-in parts on the opposite side of the door hinge with respect to the total center of gravity of the door main body itself and completely-closed windowpane.

Here, in a case where the window regulator is structured such that it can be driven by a drive motor through a wire, even when the setting position of the regulator main body is limited, the position of the drive motor can be set in a range in which the wire can be arranged. Thus, according to the other aspect of the invention, the drive motor of the window regulator is disposed in such a manner that it is situated on the opposite side of the door hinge with respect to the position of the total center of gravity of the door main body itself and completely-closed windowpane.

Since the drive motor is a heavy part and the moment of inertia is in direct proportion to the square of the distance from the door hinge, even in case where the total center of gravity of these built-in parts cannot be situated on the opposite side of the door hinge with respect to the total center of gravity of the door main body itself and completely-closed windowpane, when the drive motor is disposed in the above-mentioned manner, the moment of inertia of the whole of the door can be increased effectively, thereby being able to enhance the closing performance of the door.

By the way, in the invention, the term "windowpane" means a transparent plate for opening and closing the window portion of the door and thus the windowpane is not limited to one made of glass.

Further, in view of the above, it is an object of the invention to provide a door structure which relieves an impact load applied to a guard beam due to a side-on collision or the like and, after then, transmits the thus-relieved impact load to an inner panel dispersively so to as to avoid the development of a crack occurring in an inner panel, thereby being able to absorb the impact load sufficiently.

In attaining the above object, according to the invention, there is provided a vehicle door structure, comprising: an inner panel 101 made of a casting; and, a guard beam 102 extending in the back-and-forth direction a of a vehicle when a vehicle door is closed, the two end portions of the guard beam 102 being fixed to the inner panel 101 respectively, wherein at least one end portion of the guard beam 102 is fixed to the inner panel 101 through impact-load relieving brackets 104, 105.

In the above structure, in case where a given impact load is applied to the guard beam due to a side-on collision or the like, firstly, the brackets for relieving the impact load are deformed to thereby relieve the impact load and, after then, the thus relieved impact load is transmitted dispersively to the whole of the inner panel. This avoids the development of a crack occurred in the inner panel to thereby be able to absorb the impact load sufficiently.

Further, in view of the above circumstances, it is an object of the invention to provide an apparatus of the above type which can eliminate the number of man-hours and special parts for forming the above-mentioned projecting portion and thus can be manufactured at a low cost.

In attaining the above object, according to the invention, there is provided an apparatus for preventing a door from intruding into a vehicle room in a side-on collision vehicle structured such that, in a side-on collision, a projecting portion disposed on a door is engaged with an engaging portion formed in a vehicle body to thereby prevent the door from intruding into a vehicle room, wherein the inner panel of the door is made of a casting with the projecting portion formed integrally therewith.

According to the above structure, there can be provided an apparatus which can eliminate the number of man-hours and special parts necessary for formation of the projecting portion and thus is low in cost and light in weight.

Further, according to another aspect of the invention, there is provided an apparatus for preventing a door from intruding into a vehicle room in a side-on collision vehicle as set forth in the eighth aspect, wherein, when fastening a guard beam to the inner panel using a bolt, the projecting portion is also used as a boss portion for formation of an internal thread hole.

According to the above structure, because the projecting portion is formed integral with the guard beam by the bolt and also because the guard beam can be positively moved to the vehicle room side due to an input caused by the side-on collision, the projecting portion can be accurately engaged with the engaging portion in a proper attitude.

Further, it is an object of the invention to provide an inner panel for a vehicle door which can meet the above rigidity requirement.

In attaining the above object, according to the tenth aspect of the invention, there is provided an inner panel for a vehicle door made of a casting, wherein the thickness of a belt-shaped area extending in the back-and-forth direction of a vehicle so as to cooperate with an outer panel in forming an entrance for a windowpane and its neighboring portion is set larger than the thickness of the areas of the inner panel except the belt-shaped area.

According to the above structure, the rigidity of the belt-shaped area can be enhanced, while it is easy to increase the thickness of the belt-shaped area because the inner panel is formed by casting.

Further, the thus-thickness-increased belt-shaped area functions also as a guard beam with respect to a side-on collision. That is, the belt-shaped area can disperse the impact energy due to the side-on collision over the whole of the inner panel to thereby be able to absorb the impact energy sufficiently. On the other hand, in case where a guard beam is mounted on an inner panel made of a casting, since stresses concentrate on the guard beam mounting portion of the inner panel in a side-on collision, it is difficult to absorb the impact energy sufficiently.

Further, according to the eleventh aspect of the invention, there is provided an inner panel for a vehicle door, wherein, on the edge portion of the belt-shaped area, there is disposed a cast gate, that is, a portion which is formed by the gate of a mold to provide a scrap in such a manner that it is continuous with and extends along the edge portion.

In this structure, since the belt-shaped area of the inner panel is given a sufficient pressure during casting, the casting quality thereof is excellent and thus the rigidity thereof is enhanced.

DETAILED DESCRIPTION OF THE PREFERRED EMBODIMENTS

Figure 1:
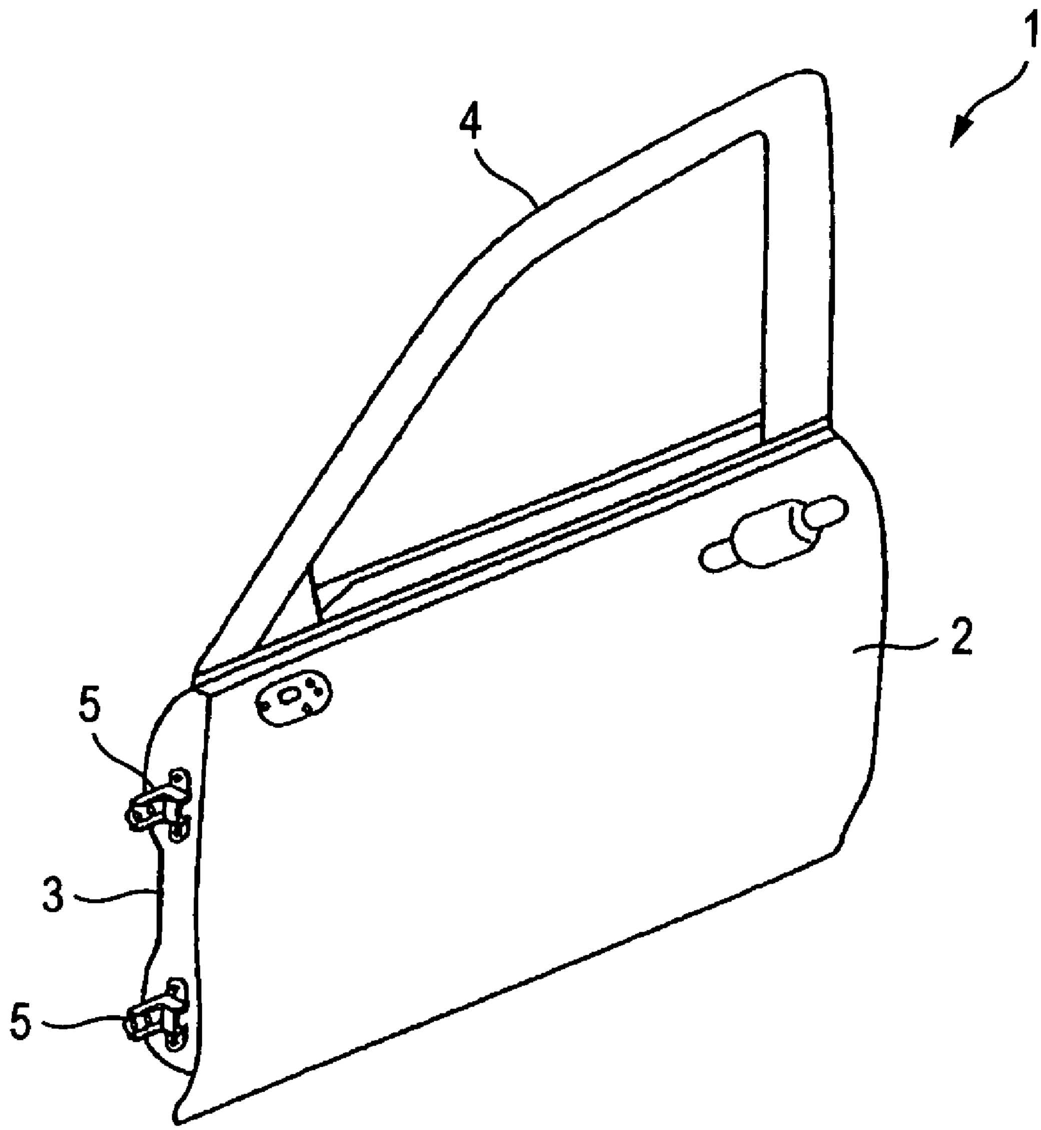
FIG. 1 is a perspective view of an embodiment of a vehicle door according to the invention.

In FIG. 1, reference character 1 designates a door main body of a vehicle door including a front door of a car. The door main body 1 can be structured in such a manner that, in a state where a door outer panel 2 and a door inner panel 3 are combined together, the peripheral edge of the door outer panel 2 is hemmed to thereby connect together the two panels 2 and 3. Further, although not shown, on the door main body 1, there is mounted a door seal which can be contacted with the door opening edge of a vehicle body.

The door outer panel 2 including an expanded member made of a light alloy such as an aluminum alloy or a magnesium alloy, and the door inner panel 3 including a casting made of a similar light alloy, thereby being able to reduce the weight of the door. Further, the door inner panel 3 includes a sash welded to the door inner panel 3, and a pair of upper and lower door hinges 5, 5 is bolted to the front end portion of the door inner panel 3.

Figure 2:
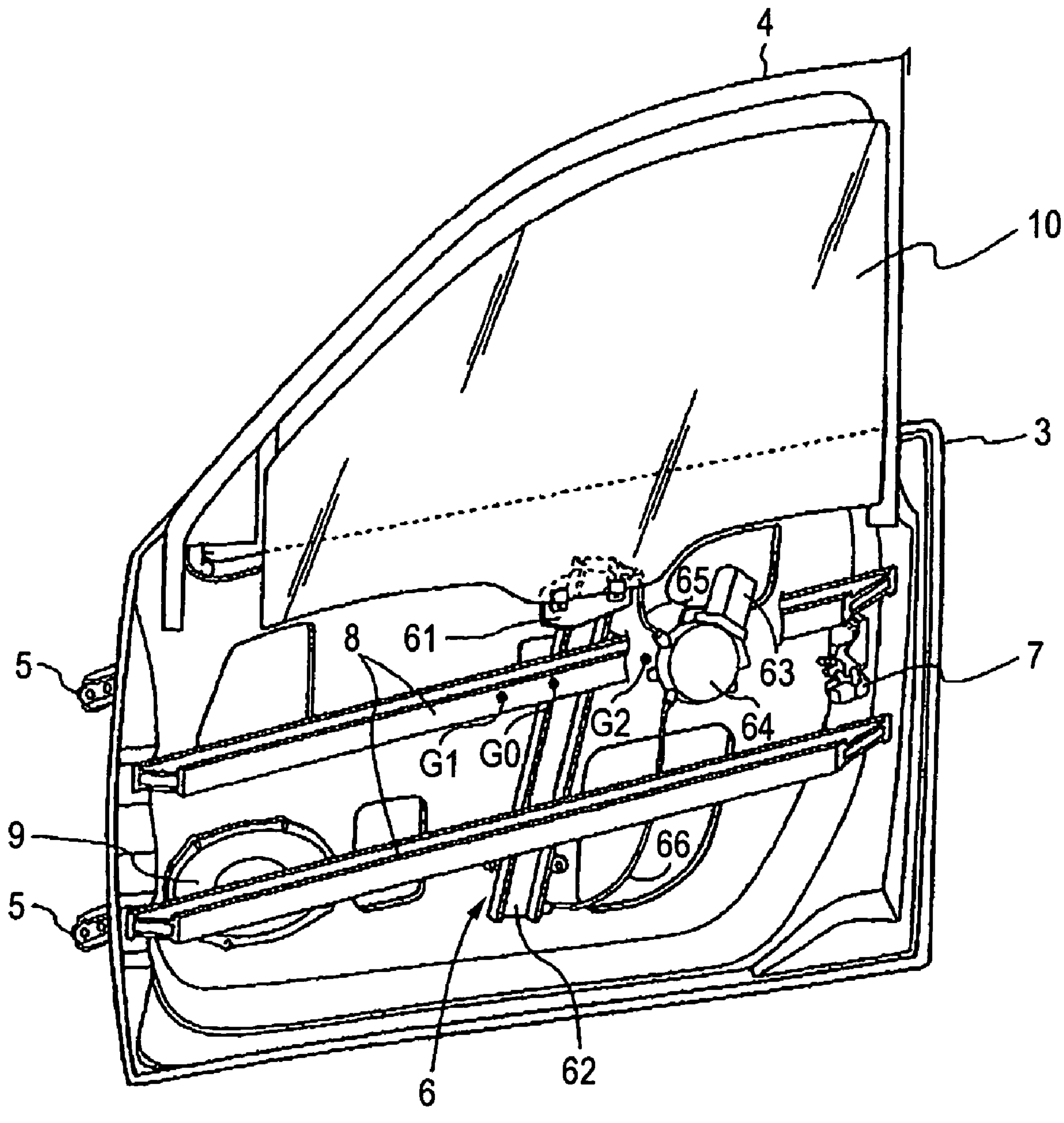
FIG. 2 is a perspective view of a door inner panel, showing a state in which built-in parts are mounted on the door inner panel.

Within the door main body 1, there are stored a plurality of built-in parts in a state where they are mounted on the door inner panel 3. FIG. 2 shows a state in which the typical ones of the built-in parts, that is, a window regulator 6, a door lock 7, guard beams 8, and a speaker 9 are mounted on the door inner panel 3. The door lock 7 is mounted on the rear end portion of the door inner panel 3, that is, the opposite side to the door hinge 5, the guard beams 8 are mounted in the form of a pair of upper and lower guard beams in such a manner that they respectively extend across the two front and rear end portions of the door inner panel 3, and the speaker 9 is mounted on the front side lower portion of the door inner panel 3.

The window regulator 6 is used to open and close a windowpane 10; and, it includes a movable member 61 to be connected to the lower edge portion of the windowpane 10, a guide rail 62 for supporting the movable member 61 so as to be movable upwardly and downwardly, and a drive motor 63 for driving or moving the movable member 61 upwardly and downwardly. The drive motor 63 includes a wire play-out portion 64. In particular, one end portion of a wire to be played out from the wire play-out portion 64 is used as a rising wire 65 and it is connected through the upper end portion of the guide rail 62 to the movable member 61; and also, the other end portion of the wire to be played out from the wire play-out portion 64 is used as a lowering wire 66 and it is connected through the lower end portion of the guide rail 62 to the movable member 61. And, using the drive motor 63, in case where the take-up of the rising wire 65 and the play-out of the lowering wire 66 are executed through the wire play-out portion 64, the movable member 61 is raised to thereby close the windowpane 10; and, on the other hand, in case where the play-out of the rising wire 65 and take-up of the lowering wire 66 are carried out, the movable member 61 is lowered to thereby open the windowpane 10.

Here, the guide rail 62 must be mounted in the back-and-forth-direction central portion of the door inner panel 3, whereas the mounting position of the drive motor 63 can be set freely in such a range as can arrange the wires 65, 66. And, in the present embodiment, the drive motor 63 is mounted on the door inner panel 3 on the opposite side of the door hinge 5 with respect to the position of the total center of gravity G1 of the whole combination of the door main body 1 itself (excluding the built-in parts) and completely closed windowpane 10, that is, in such a manner that the drive motor 63 is spaced backwardly from the center of gravity G1. Further, the mounting position of the drive motor 63 is set relatively upwardly.

Due to the above lay-out, the total center of gravity G2 of the built-in parts including the window regulator 6, door lock 7, guard beams 8 and speaker 9 is situated in the rear of the total center of gravity G1 of the door main body 1 itself and completely-closed windowpane 10. Further, the total center of gravity of the door main body 1 itself, the completely-closed windowpane 10 and the built-in parts, that is, the center of gravity G0 of the whole door is situated in a given vertical-direction range the center of which is the vertical-direction central portion of the door main body 1, namely, the vertical-direction central portion between the lower end of the door main body 1 and the upper end of the sash 4. Here, the above-mentioned vertical-direction range is set as a range in which the distances spaced upwardly and downwardly from the vertical-direction central portion of the door main body 1 are equal to or less than ¼ of the height dimension of the door main body 1, that is, ¼ of the height dimension from the lower end of the door main body 1 to the upper end of the sash 4.

According to this structure, the built-in parts can function effectively as an element for increasing the moment of inertia of the door with the door hinge 4 as a fulcrum and thus, even in the case of a door the weight of which is reduced by making the door inner panel 2 and door outer panel 3 of a light alloy, a great deal of kinetic energy can be obtained with a small closing speed, thereby being able to enhance the closing performance of the door. Further, since the center of gravity G0 of the whole door does not deviate greatly to one of the upward and downward directions, when the door seal is contacted with the door opening edge portion of the vehicle body just before the door is completely closed, the door seal can be compressed evenly over the entire length thereof, thereby being able to prevent the degraded closing performance caused by the uneven compression of the door seal.

By the way, in the above-mentioned embodiment, the total center of gravity G2 of the built-in parts including the window regulator 6, door lock 7, guard beams 8 and speaker 9 is situated in the rear of the total center of gravity G1 of the door main body 1 itself and completely-closed window-pane 10. However, even in case where the back-and-forth-direction position of the center of gravity G2 is identical with or slightly forwardly of the center of gravity G1, provided that the drive motor 63 of the window regulator 6 is arranged in the rear of the center of gravity G1, the moment of inertia of the door is increased effectively by the drive motor 63 which is heavy in weight, the degradation of the door closing performance due to the reduction of the weight of the door can be avoided to a certain degree.

Further, in the above embodiment, there is used a door with the sash 4. However, the invention can also be similarly applied to a door with no sash. Further, in the above embodiment, the door outer panel 2 and door inner panel 3 are both made of a light alloy; however, the invention can be similarly applied even to a door in which only one of the door outer panel 2 and door inner panel 3 is made of a light alloy. Further, the front door as in the above embodiment is not limitative, but the invention can also be similarly applied even to a rear door.

Figure 3:
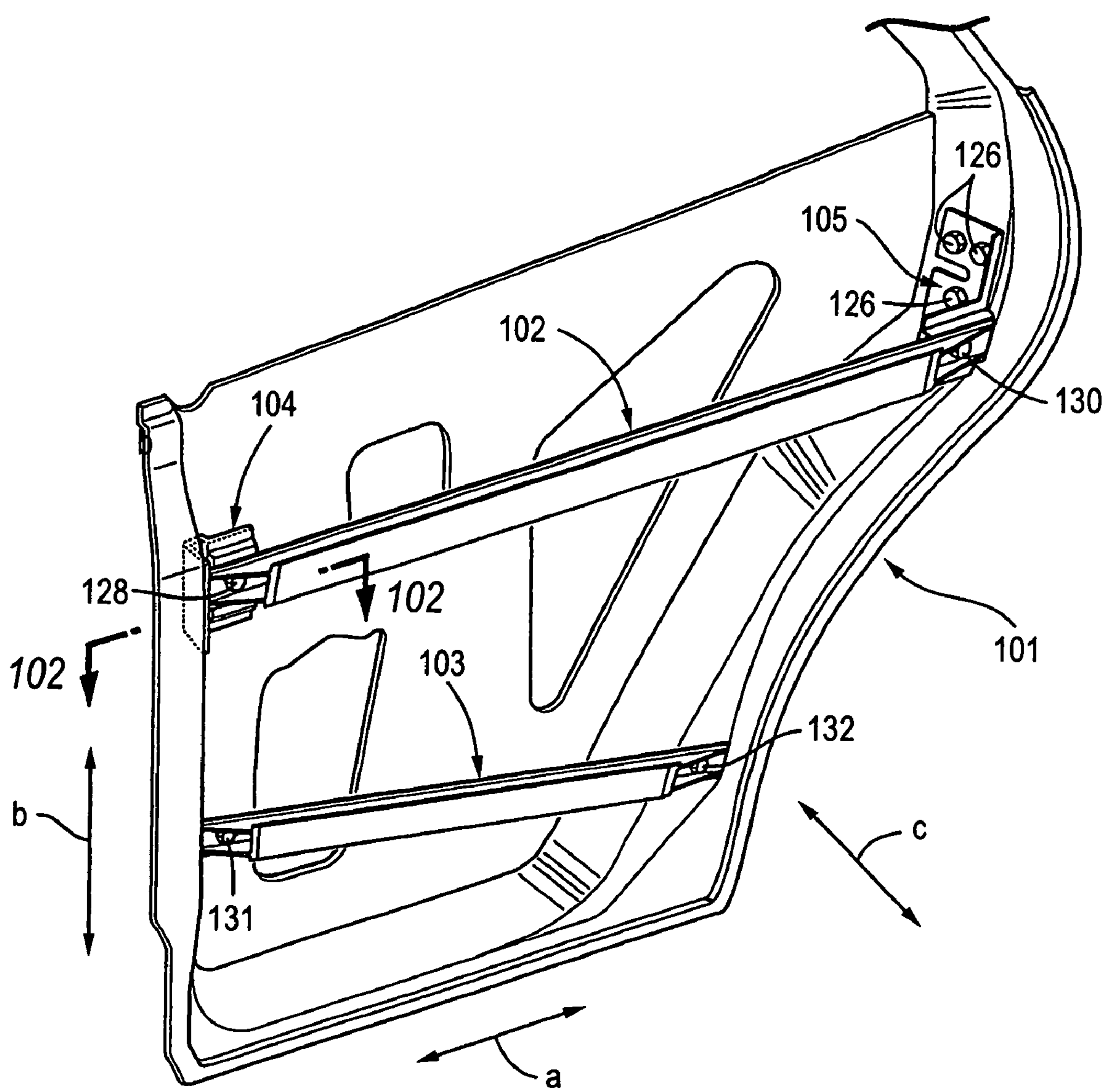
FIG. 3 is a perspective view of an embodiment of a vehicle door structure.

In FIG. 3, a vehicle door structure comprises an inner panel 101 including a casting, specifically, an Al alloy casting and, angular-pipe-shaped upper and lower guard beams 102, 103 which respectively include an Al alloy extruded member and also, when a vehicle door is closed, respectively extend in the back-and-forth direction a of a vehicle with the two end portions thereof fixed to the inner panel 101. At least one end portion of the upper guard beam 102, in the present embodiment, the front and rear end portions thereof are fixed to the inner panel 101 through front and rear brackets 104, 105 which respectively include steel plates for relieving the impact load.

As shown in FIGS. 4 to 7, the front bracket 104 includes a fixing portion 106 to be fixed to the inner panel 101, a mounting portion 107 for mounting the upper guard beam 102, and a connecting portion 108 for connecting together these two portions. The fixing portion 106 is formed so as to have a rectangular-flat-plate shape including two long sides extending in the vertical direction b of the vehicle and, in the upper and lower portions of the fixing portion 106, there formed two bolt insertion holes 109 each having a center axis which, in the door-closed state, extends in the back-and-forth direction a of the vehicle. The mounting portion 107 includes a rectangular-flat-plate-shaped portion 110 including two long sides extending in the vertical direction b of the vehicle and a pair of hook-shaped reinforcing portions 111, while the rectangular-flat-plate-shaped portion 110 includes a circular-shaped bolt insertion hole 112 having a center axis which, in the door-closed state, extends in the right-and-left direction c of the vehicle. The connecting portion 108 is formed in a hook-like shape; and, one of the edge portions, which is formed straight, is continuously connected to the fixing portion 106, whereas the other edge portion formed almost in a crankshaft-like shape is continuously connected to the mounting portion 107.

Figure 4:
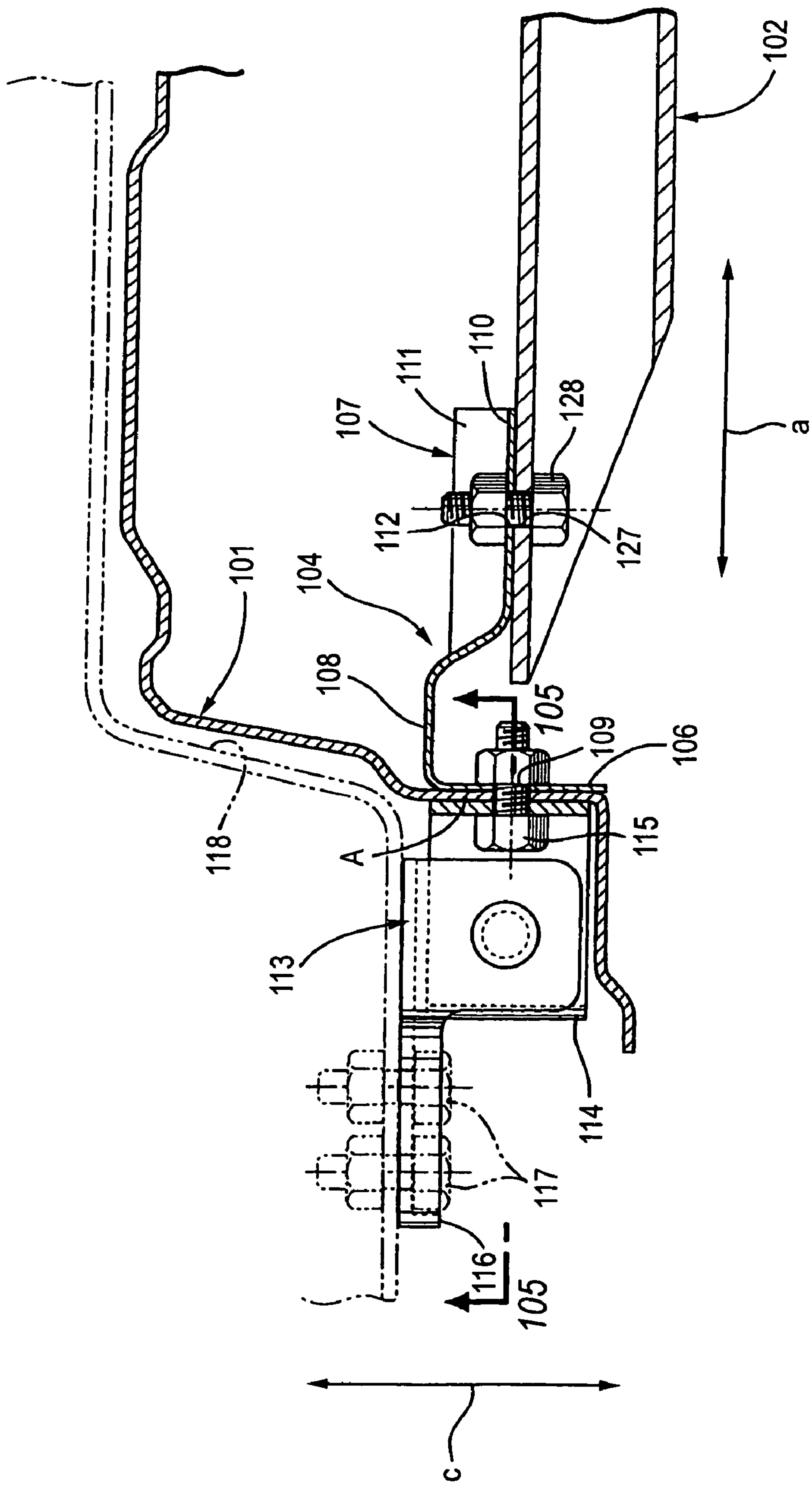
FIG. 4 is an enlarged section view taken along the line 102—102 shown in FIG. 3.
Figure 5:
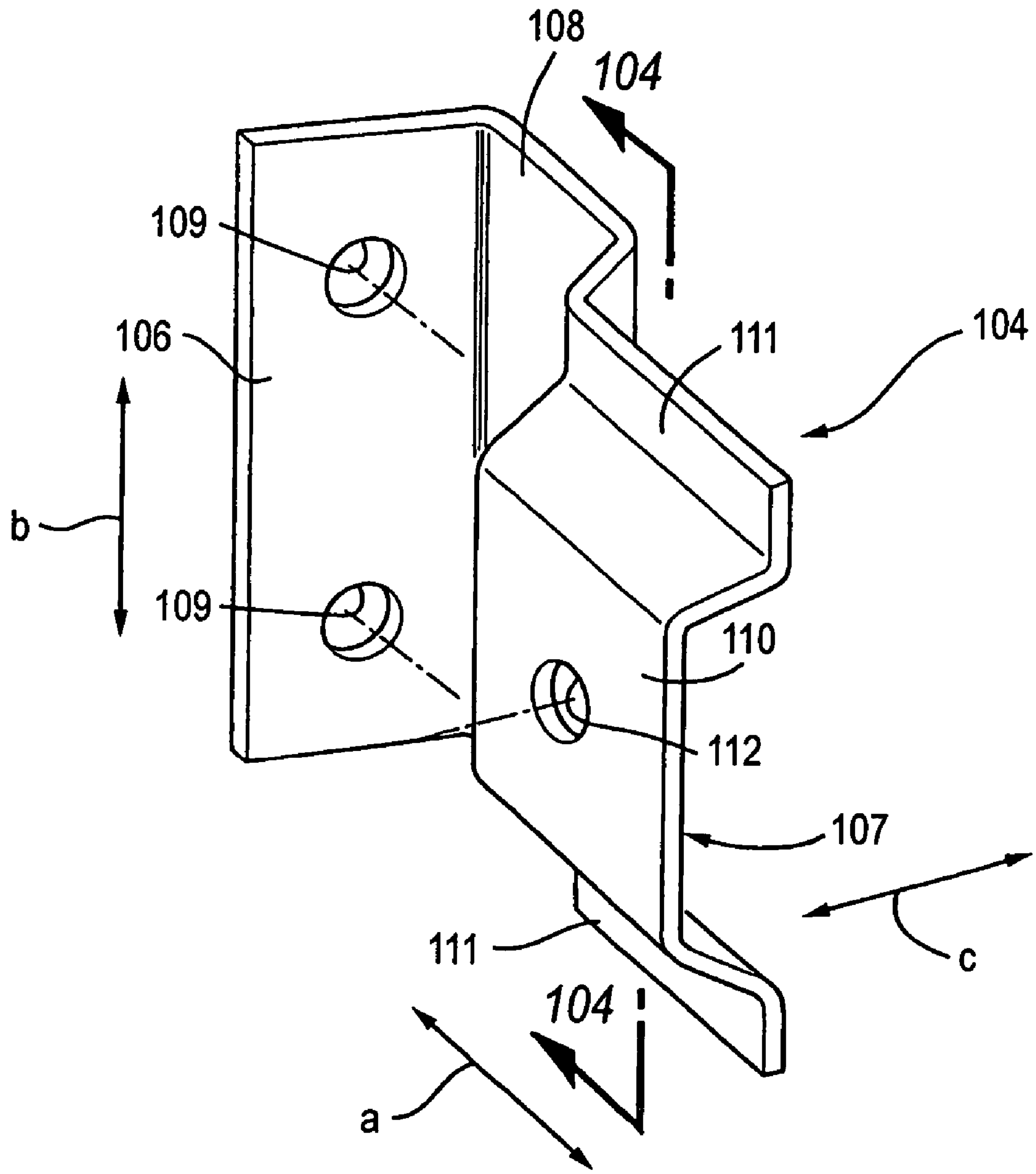
FIG. 5 is a perspective view of a front bracket.
Figure 7:
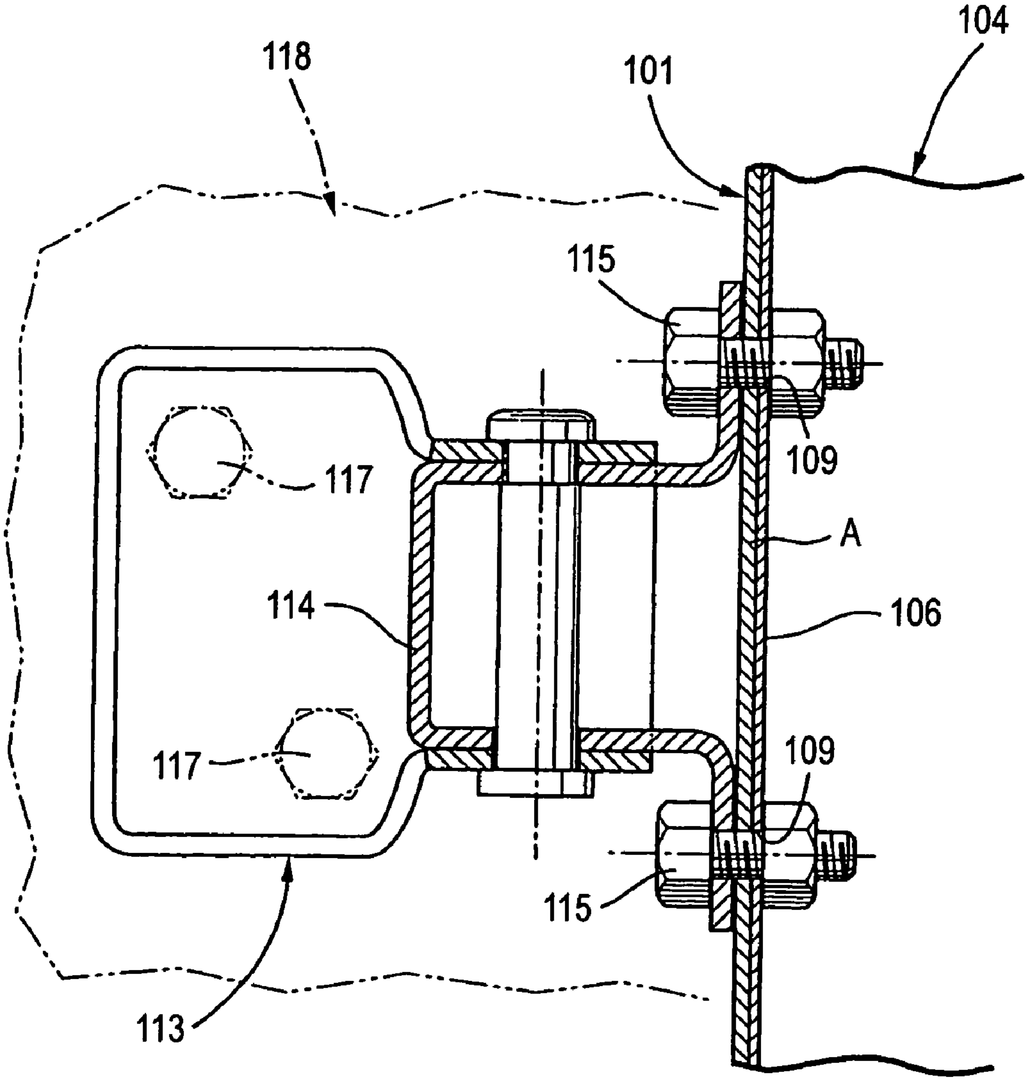
FIG. 7 is an enlarged section view taken along the line 105—105 shown in FIG. 4.

As shown clearly in FIGS. 4 and 7, the fixing portion 106 of the front bracket 104 is disposed in such a manner that it cooperates together with one half body 114 of a door hinge 113 to surround the hinge mounting area A of the inner panel 101; and, the fixing portion 106, hinge mounting area A and one half body 114 are fastened together by two bolt joints 115. In this case, in the door-closed state, the rectangular-flat-plate-shaped portion 110 of the mounting portion 107 is disposed in the outside of a vehicle room, whereas the two hook-shaped reinforcing portions 111 are disposed in the inside of the vehicle room. The other half body 116 of the door hinge 113 is mounted onto a vehicle body 118 by two bolt joints 117.

Figure 8:
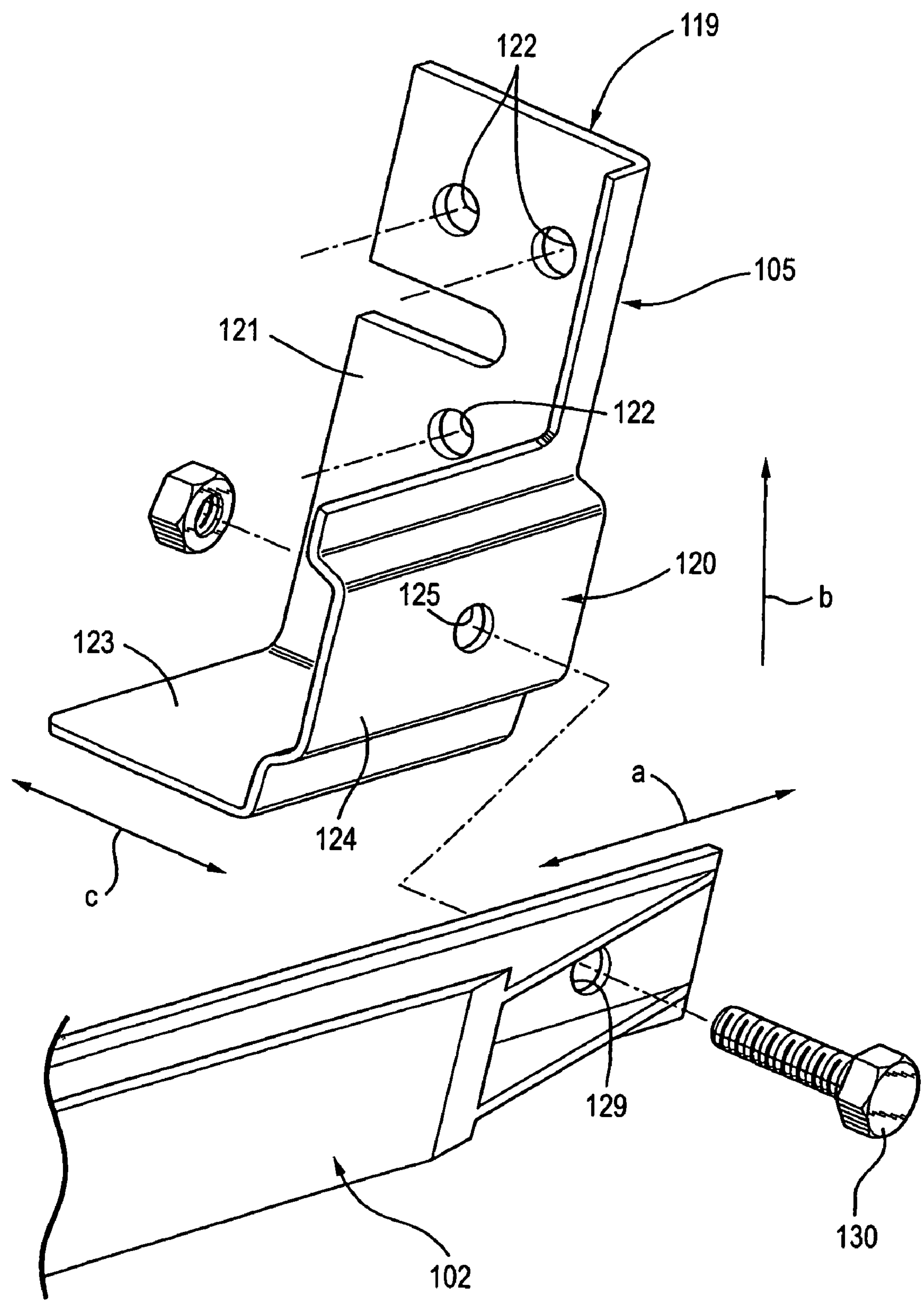
FIG. 8 is an exploded perspective view of a rear bracket and an upper guard beam, showing their relationship.

As shown in FIGS. 3 and 8, the rear bracket 105 includes a fixing portion 119 to be fixed to the inner panel 101 and a mounting portion 120 to be mounted onto the upper guard beam 102. The fixing portion 119 has a shape which can be obtained by bending a flat plate into a hook-like shape, and the fixing portion 119 includes an upper half body 121 extending in the vertical direction b of the vehicle and a lower half body 123, which, in a state where the door is closed, extends in the back-and-forth direction a of the vehicle; and, in the upper half body 121, there are formed three bolt insertion holes 122 respectively having center lines which, in the door closed state, extend in the back-and-forth direction a of the vehicle. The mounting portion 120 is connected continuously with the respective one-side edges of the upper and lower half bodies 121, 123 which, in the door closed state, are situated on the outside of the vehicle room; and also, the mounting portion 120 includes a rectangular-flat-plate-shaped portion 124 having long sides which, in the door closed state, extend in the back-and-forth direction a of the vehicle. In the rectangular-flat-plate-shaped portion 124, there is formed a circular-shaped bolt insertion hole 125 having a center line which, in the door closed state, extends in the right-and-left direction c of the vehicle. The upper half body 121 of the fixing portion 119 can be fastened to the inner panel 101 by three bolt joints 126.

Figure 6:
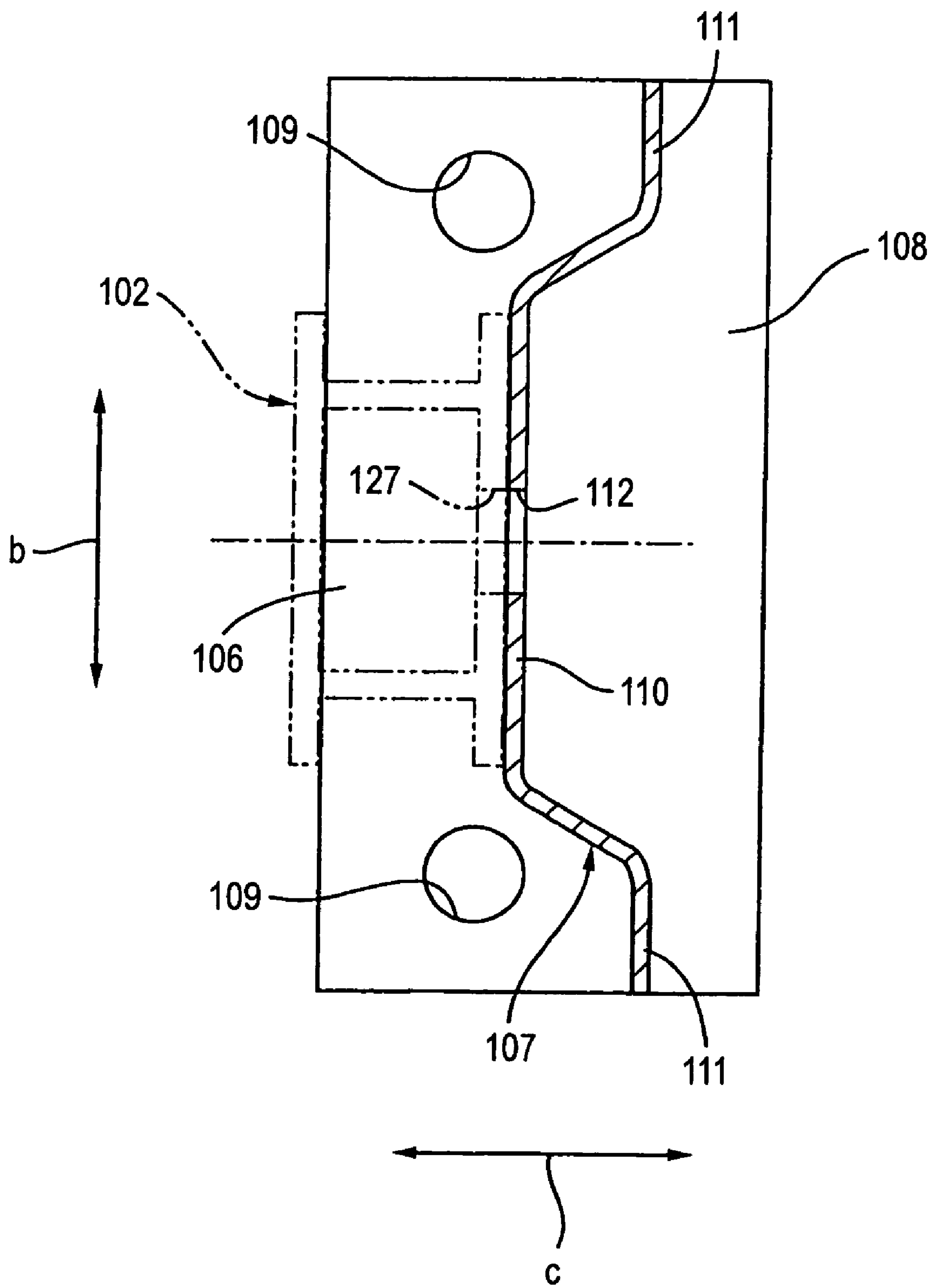
FIG. 6 is an enlarged section view taken along the line 104—104 shown in FIG. 5.

As shown clearly in FIGS. 4 and 6, in one end portion of the upper guard beam 102, there is formed a circular-shaped bolt insertion hole 127; and, this one end portion, as shown in FIG. 3 as well, can be fastened to the rectangular-flat-plate-shaped portion 110 of the mounting portion 107 of the front bracket 104 using a bolt joint 128. As shown clearly in FIG. 8, in the other end portion of the upper guard beam 102, there is formed a circular-shaped bolt insertion hole 129; and, the present other end portion, as shown in FIG. 3 as well, can be fastened to the rectangular-flat-plate-shaped portion 124 of the mounting portion 120 of the rear bracket 105 using a bolt joint 130.

In the case of the above structure, when a given impact load is applied to the upper guard beam 102 due to a side-on collision or the like, firstly, the impact-load relieving front and rear brackets 104, 105 are deformed to thereby relieve the impact load and, after then, the thus relieved impact load is dispersively transmitted to the whole of the inner panel 101. This can avoid the development of a crack occurred in the inner panel 101, so that the impact load can be absorbed sufficiently. Further, since the fixing portion 106 of the front bracket 104 is contacted with the hinge mounting area A of the inner panel 101, the hinge mounting area A is reinforced by the fixing portion 106.

As shown in FIG. 3, the two end portions of the lower guard beam 103 are respectively fastened directly to the inner panel 101 using their associated bolt joints 131, 132. The reason for this is that, when the impact load acting on the lower guard beam 103 is taken into account, there is no need to use a bracket.

Figure 9:
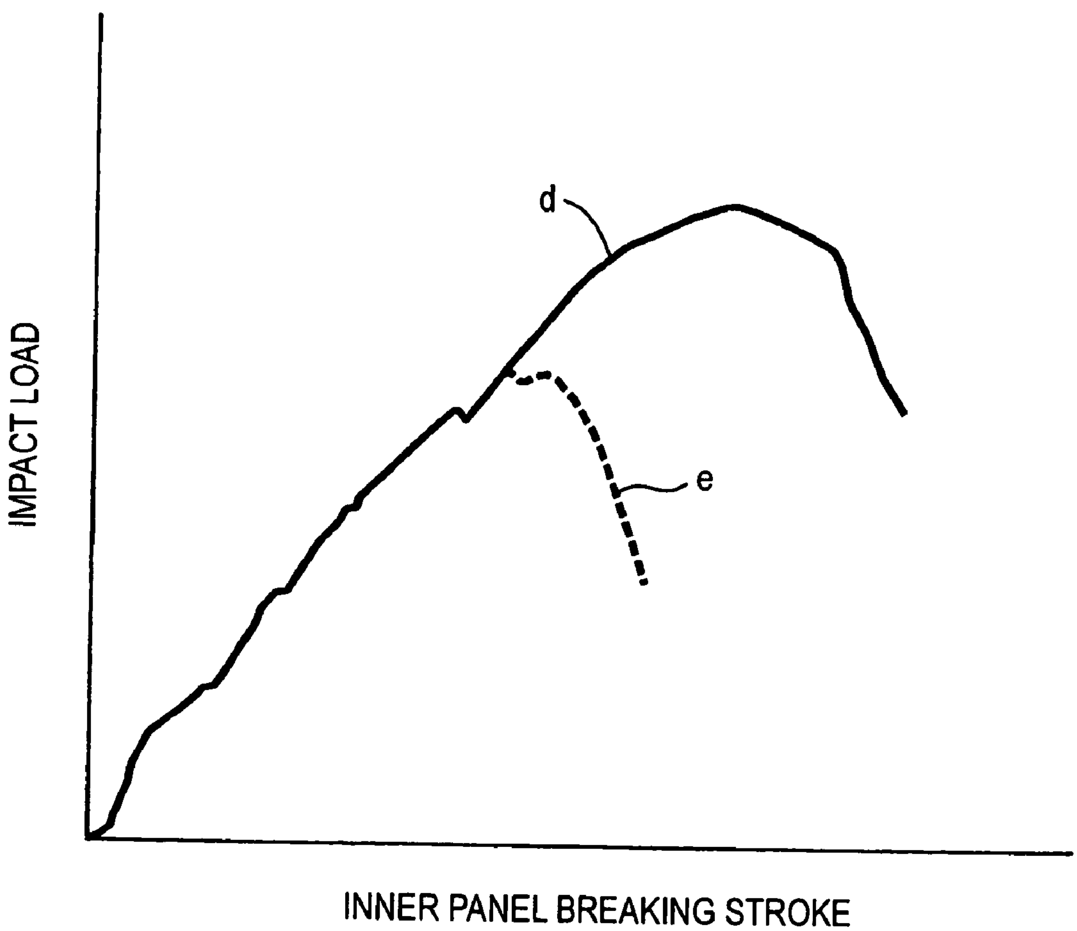
FIG. 9 is a graphical representation of the relationship between an inner panel breaking stroke and an impact load.

Now, FIG. 9 shows the results of a strength test conducted on door structures. In FIG.9, a line d corresponds to a structure in which the upper guard beam 102 is fastened through the front and rear brackets 104, 105 to the inner panel 101, while a line e corresponds to a structure in which the upper guard beam 102 is fastened directly to the inner panel 101. In case where the front and rear brackets 104, 105 are used, as in the line d, a peak impact load and an inner panel breaking stroke can be made larger than the case shown by the line e.

Figure 10:
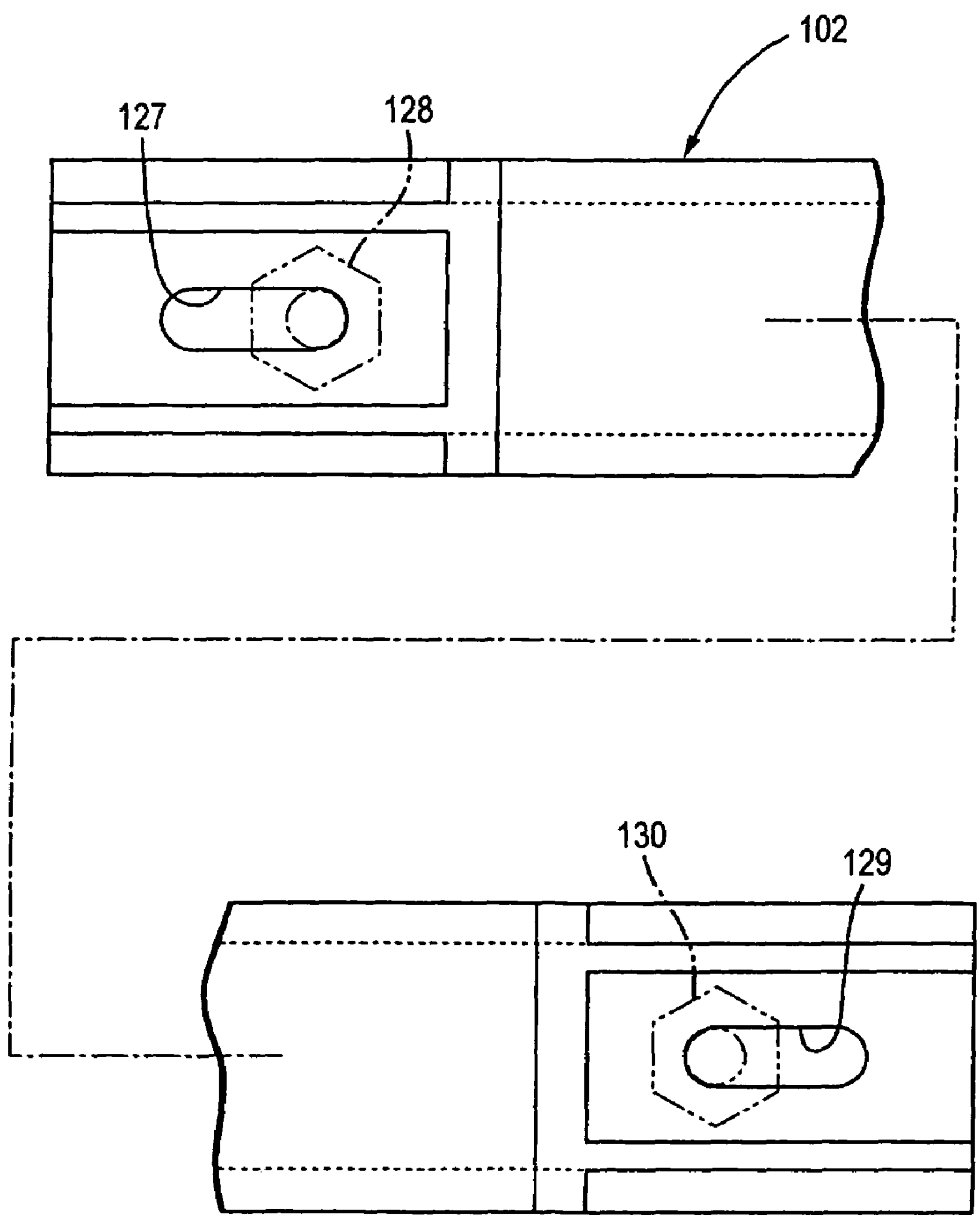
FIG. 10 is a front view of a modification of the upper guard beam.

Now, FIG. 10 shows a structure in which the bolt insertion holes 127, 129 of the upper guard beam 102 are formed as elongated holes to thereby allow the upper guard beam 102 to slide with respect to the front and rear brackets 104, 105 when an impact load is applied. In the case of this structure, by adjusting the fastening forces of the bolt joints 128, 130, in a side-on collision, firstly, the upper guard beam 102 can be slided with respect to the front and rear brackets 104, 105, thereby being able to increase the breaking stroke of the inner panel 101. In this case, since the bolt insertion holes 127, 129 of the upper guard beam 102 are formed as elongated holes, with the side-on collision, the upper guard beam 102 can be slided in every direction around the bolt joints 128, 139.

Figure 11:
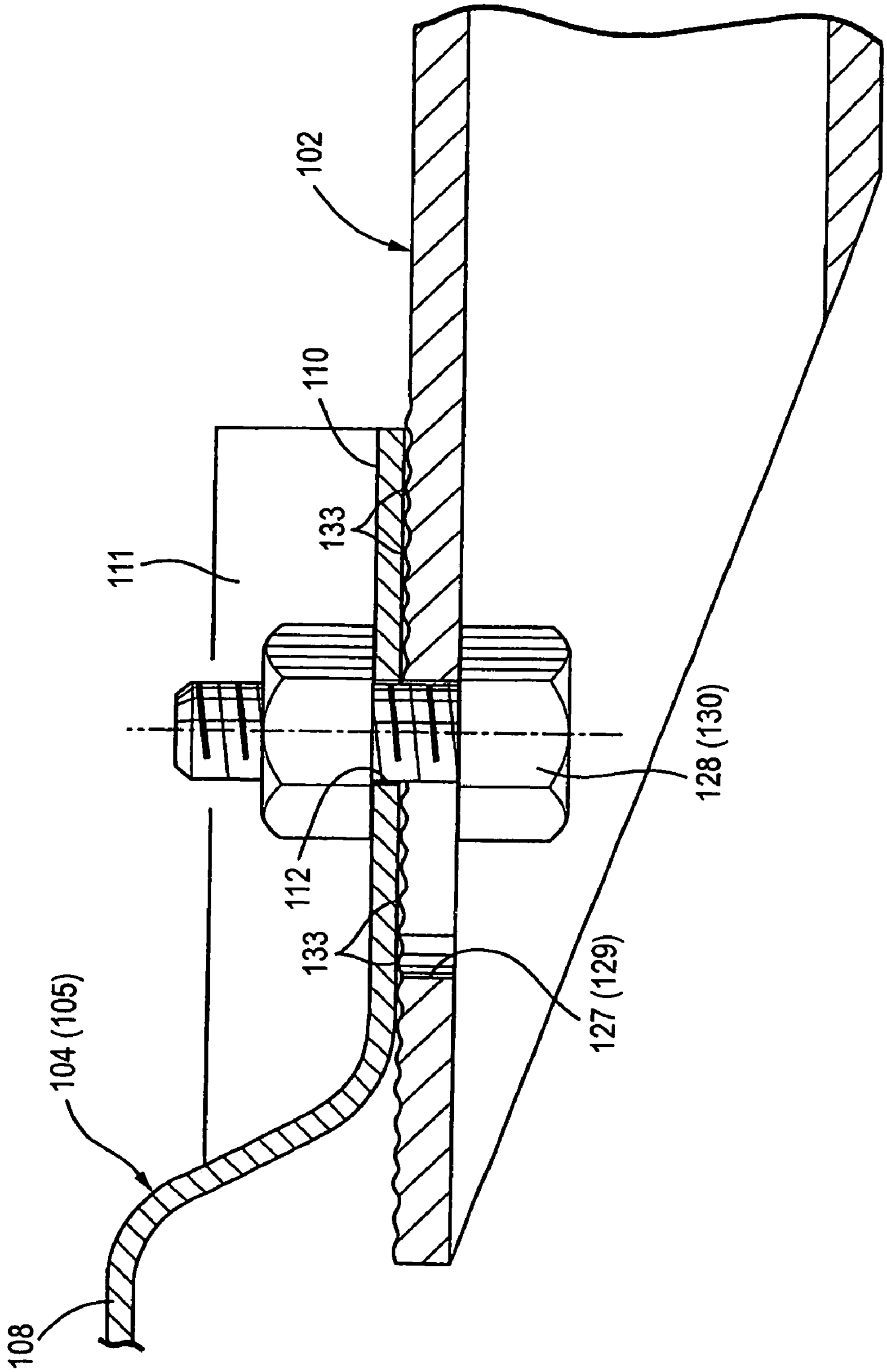
FIG. 11 is a section view of a modification of the structure for fastening together the front bracket and upper guard beam, corresponding to FIG. 4.

When setting the sliding motion start load of the upper guard beam 102, in addition to the above-mentioned adjustment of the fastening forces of the bolt joints 128, 130, as shown in FIG. 11, there can be employed means for adjusting the surface roughness of the two contact surfaces; specifically, on one of the mutually opposed two contact surfaces of the front and rear brackets 104, 105 and upper guard beam 102, in the present embodiment, on the upper guide beam 102 side, there are provided a plurality of projecting portions 133. This can reduce the contact surface areas of the above two contact surfaces and, therefore, in case where the fastening forces of the bolt joints 128, 130 are constant, the sliding motion start load of the upper guard beam 102 becomes small.

According to the forth aspect of the invention, as described above, there can be provided a vehicle door structure which relieves an impact load applied to the guard beam due to a side-on collision or the like and, after then, transmits the thus relieved impact load to the inner panel dispersively to the inner panel to avoid the development of a crack occurred in the inner panel, thereby being able to absorb the impact load sufficiently.

According to the fifth aspect of the invention, there can be provided a vehicle door structure which, in addition to the above-mentioned effect, can reinforce the hinge mounting area of the inner panel.

According to the sixth aspect of the invention, there can be provided a vehicle door structure which, due to the sliding movement of the guard beam, can further enhance the above-mentioned impact load absorbing effects.

According to the seventh aspect of the invention, there can be provided a vehicle door structure which can expand the setting range of the sliding movement start load of the guard beam.

Figure 12:
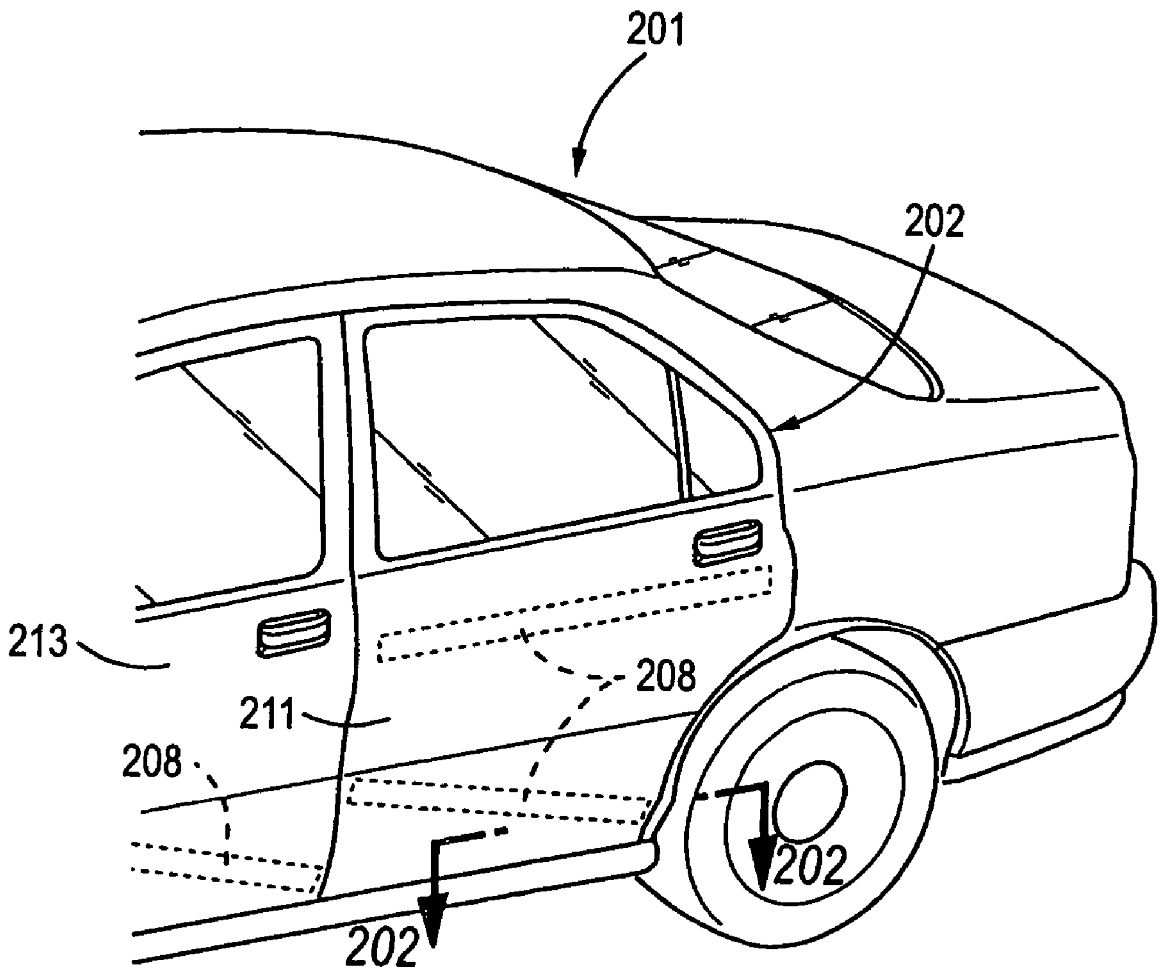
FIG. 12 is a perspective view of the main portions of a vehicle.
Figure 13:
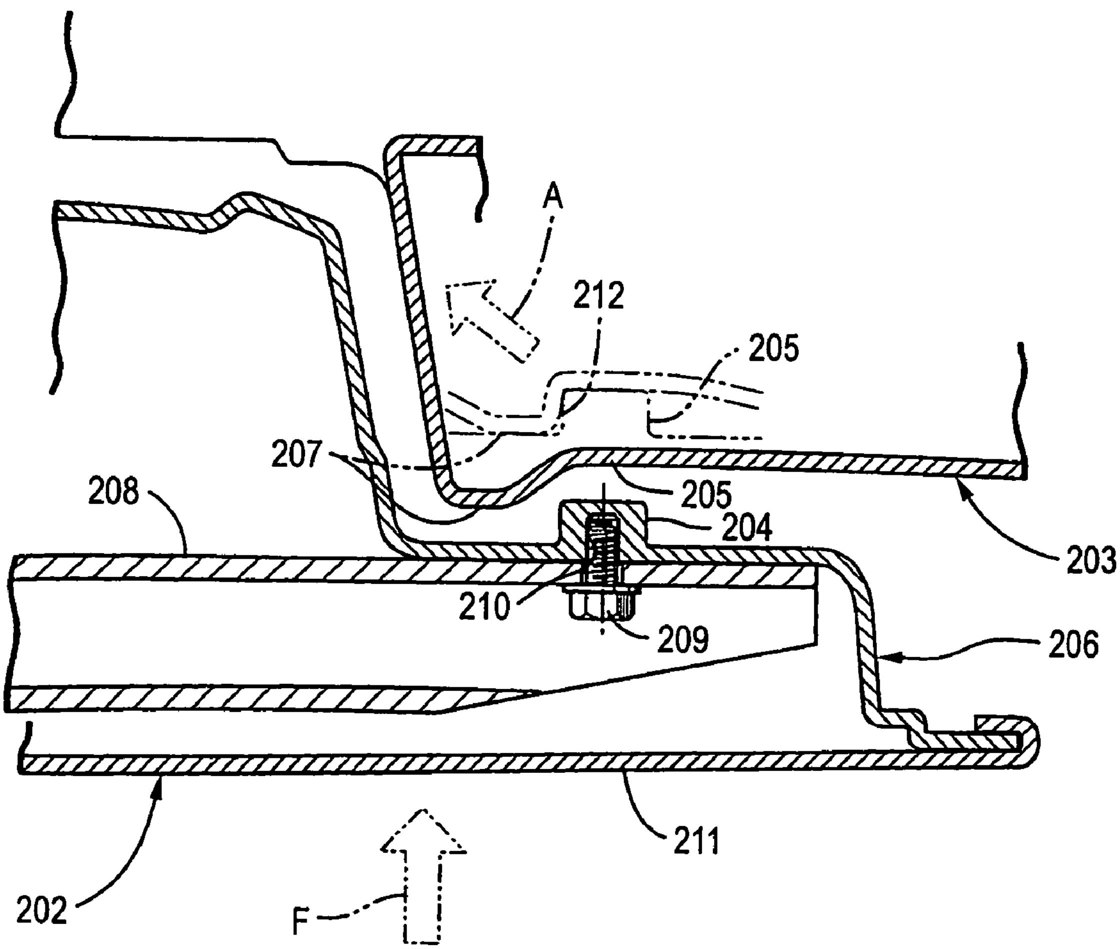
FIG. 13 is an enlarged section view taken along the line 202—202 shown in FIG. 12.

As shown in FIGS. 12 and 13, in the lower portion of a rear door 202 of a vehicle (a car) 201 on the opposite side to the hinge mounting portion side thereof, between a vehicle body 203 and rear door 202, there is interposed an apparatus which, when the vehicle 201 is collided side-on, prevents the rear door 202 from intruding into a vehicle room.

The present apparatus is structured such that, when the vehicle is collided side-on, a projecting portion 204 formed in the rear door 202 can be engaged with a rear engaging portion 205 formed in the vehicle body 203 to thereby prevent the intrusion of the rear door 202 into the vehicle room.

In the present embodiment, the inner panel 206 of the rear door 202 is made of a casting including the projecting portion 204 as an integral portion therewith, for example, an Al alloy casting. Further, in the case of the engaging portion 205, a raised portion 207 is disposed in a portion of a steel plate for constituting the vehicle body 203 and this raised portion 207 is used as a rear skirt portion of the vehicle to thereby provide the engaging portion 205. Thus, when the rear door 202 is closed, the projecting portion 204 can be opposed to the engaging portion 205.

The projecting portion 204 is also used as a boss portion for forming an internal thread hole when an angular-pipe-shaped guard beam 208 is fastened to the inner panel 206 using a bolt 209. The guard beam 208 is made of e.g. an Al alloy extruded member. In FIGS. 12 and 13, reference character 211 designates an outer panel made of an Al alloy.

In the above-mentioned structure, in case where an impact force F is applied to the rear door 202 due to a side-on collision, as shown by a chained line in FIG. 13, the projecting portion 204 is bitingly engaged into the engaging portion 205 and the raised portion 207 is deformed to thereby provide a stepped portion 212, which can prevent such intrusion of the rear door 202 into the vehicle room as shown by the arrow mark A.

In this case, because the projecting portion 204 is formed integral with the guard beam 208 by the bolt 209 and also because the guard beam 208 can be positively moved to the vehicle room side due to the impact force F, the projecting portion 204 can be accurately engaged with the engaging portion 205 in a proper attitude.

The above door intrusion preventive apparatus can also be applied to a front door 213.

According to the eighth aspect of the invention, thanks to the above-mentioned structure, there can be provided an apparatus which can eliminate the number of man-hours and parts necessary for formation of a projecting portion on the door side and thus can be produced at a low cost.

According to the ninth aspect of the invention, there can be provided the above apparatus which, in addition to the above effects, can provide another effect that the reliability thereof with respect to the intrusion prevention of the door into the vehicle room can be enhanced. Further, there can be obtained secondary effects: that is, when compared with a structure in which a guard beam is fastened to an inner panel using a bolt and a nut, the nut can be omitted; when compared with a structure in which a boss portion for formation of an internal thread hole is formed in the inner panel separately from a projecting portion, the structure of the inner panel can be simplified and further, the cost of a mold can be reduced.

Figure 14:
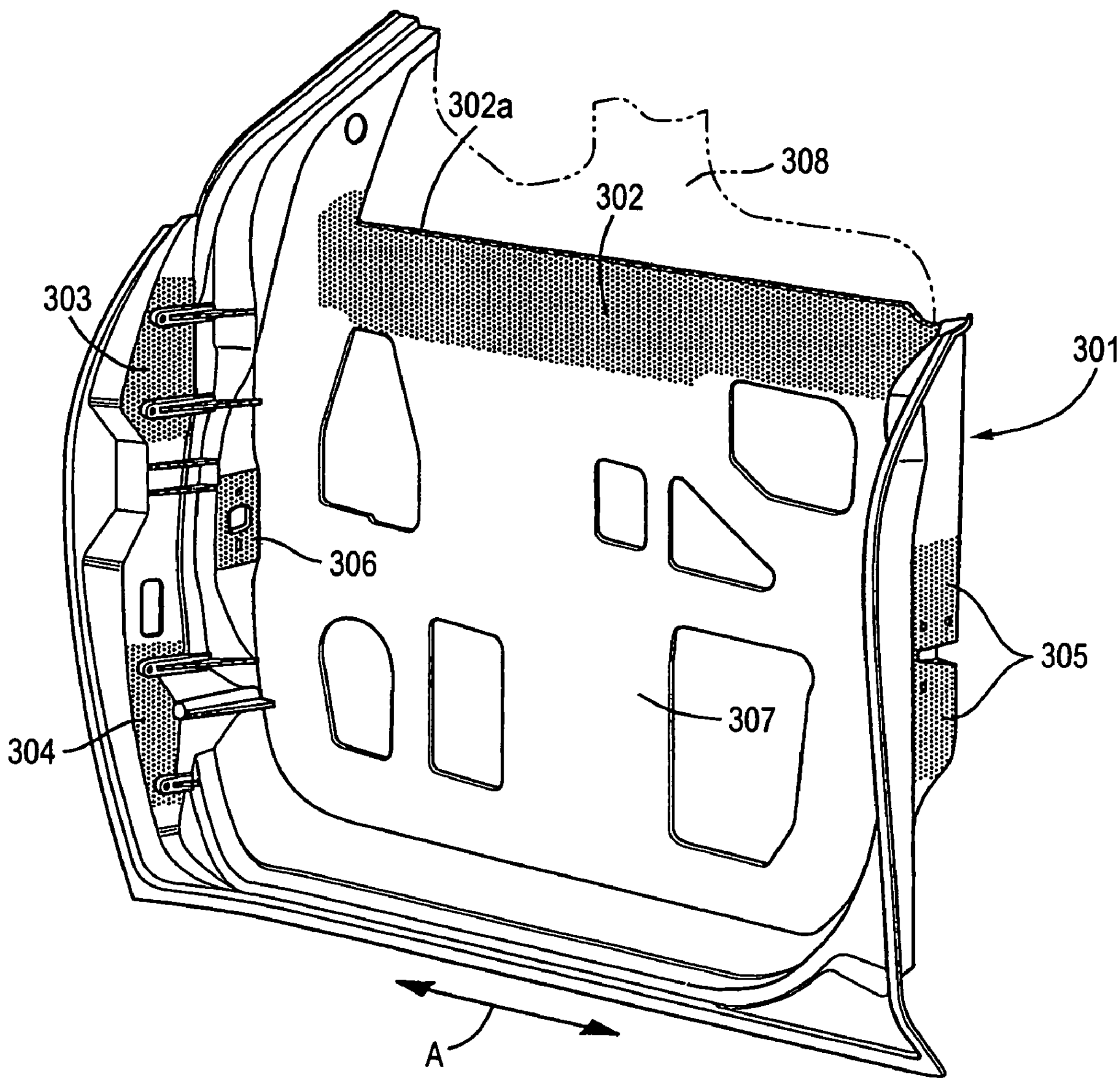
FIG. 14 is a perspective view of an inner panel for a vehicle door.

In FIG. 14, an inner panel 301 for a vehicle door is made of a casting, specifically, an Al alloy casting. In the inner panel 301, the belt-shaped area 302 of the inner panel, which extends in the back-and-forth direction A of the vehicle so as to form an entrance of a windowpane and its neighboring portion through cooperation with an outer panel, that is, an area shown by dots in FIG. 14 is set larger in thickness than the areas of the inner panel except the belt-shaped area 302.

For example, the thickness of the belt-shaped area 302 is set as 3 mm. And, for the respective thicknesses of other portions of the inner panel that are similarly shown by dots similarly, specifically speaking, thicknesses of the upper and lower door hinge mounting areas 303, 304 as well as the thicknesses of the door lock mounting areas 305 and door checker area 306 are respectively set as 2.5 mm; and, the thicknesses of the other remaining areas 307 of the inner panel than these areas 302, 303, 304, 305 and 306 are respectively set as 1.5 mm.

In case where the inner panel 301 is structured in the above-mentioned manner, the rigidity of the belt-shaped area 302 can be enhanced and also it is easy to increase the thickness of the belt-shaped area 302 is easy because the inner panel is formed by casting.

Further, the thus-thickness-increased belt-shaped area 302 functions also as a guard beam when a side-on collision occurs, so that the impact energy due to the side-on collision can be dispersed over the whole of the inner panel 301 and thus such impact energy can be absorbed sufficiently.

And, on the edge portion 302*a* of the belt-shaped area 302, there is disposed a cast gate 308, that is, a portion which is formed by the gate of a mold to provide a scrap in such a manner that the gate 308 extends over the entire length of the edge portion 302*a*.

The thus-structured belt-shaped area 302 of the inner panel 301 is given a sufficient pressure during casting, so that the cast quality thereof is excellent and thus the rigidity thereof is enhanced.

According to the tenth aspect of the invention, thanks to employment of the above structure, it is possible to provide an inner panel for a vehicle door made of a casting which is enhanced in the rigidity of the belt-shaped area for forming the entrance of the windowpane and its neighboring portion and also can provide a highly effective guard effect with respect to a side-on collision.

According to the eleventh aspect of the invention, the above effects can be increased further.

What is claimed is:

1. A vehicle door comprising:

a door main body including a door outer panel and a door inner panel, at least one of the door outer panel and the door inner panel being made of a light alloy, a door hinge for opening and closing the vehicle door disposed on one end of the door inner panel, and a windowpane and a plurality of built-in parts stored within the door main body while being mounted on the door inner panel, the built-in parts including a window regulator for opening and closing the windowpane, wherein the plurality of built-in parts are disposed such that the total center of gravity of the built-in parts is situated on the opposite side of the door hinge with respect to the total center of gravity of the door main body itself and the completely-closed windowpane.

2. The vehicle door as set forth in claim 1, wherein the total center of gravity of the door main body itself, the completely-closed windowpane and the plurality of built-in parts is situated in a given upward-and-downward-direction range with the upward-and-downward-direction center of the door main body as a center thereof, wherein outermost upper and lower limits of the upward-and-downward-direction range are ¼ of a total vertical height from a lower end of the door main body to an upper end of the door main body, respectively.

3. The vehicle door as set forth in claim 1, wherein the window regulator is drivable by a drive motor through a wire, and wherein the drive motor is disposed on the opposite side of the door hinge with respect to the total center of gravity of the door main body itself and the completely-closed windowpane.

* * * * *